United States Patent [19]

Shimomura et al.

[11] Patent Number: 5,651,814

[45] Date of Patent: Jul. 29, 1997

[54] INK, AND INK-JET RECORDING METHOD AND INSTRUMENTS USING THE SAME

[75] Inventors: Masako Shimomura, Yokohama; Yutaka Kurabayashi, Tokorozawa, both of Japan

[73] Assignee: Canon Kabushiki Kaisha, Tokyo, Japan

[21] Appl. No.: 710,956

[22] Filed: Sep. 24, 1996

[30] Foreign Application Priority Data

Sep. 29, 1995 [JP] Japan .................................. 7-275154

[51] Int. Cl.⁶ .................................................. C09D 11/14
[52] U.S. Cl. ......................... 106/31.36; 106/31.68; 347/100
[58] Field of Search ....................... 106/25 R, 20 D, 106/22 F, 23 F

[56] References Cited

U.S. PATENT DOCUMENTS

| 4,694,302 | 9/1987 | Hackleman et al. | 106/20 D |
|---|---|---|---|
| 5,108,504 | 4/1992 | Johnson et al. | 106/25 A |
| 5,113,803 | 5/1992 | Moffatt | 106/25 A |
| 5,226,957 | 7/1993 | Wickramanayake et al. | 106/25 R |
| 5,579,038 | 11/1996 | Kimura | 347/36 |

FOREIGN PATENT DOCUMENTS

| 331272 | 11/1992 | Japan . |
|---|---|---|
| 6-329966 | 11/1994 | Japan . |

*Primary Examiner*—Helene Klemanski
*Attorney, Agent, or Firm*—Fitzpatrick, Cella, Harper & Scinto

[57] ABSTRACT

Disclosed herein is an ink comprising a recording agent, succinylated carboxymethylchitosan and a liquid medium.

15 Claims, 3 Drawing Sheets

INK, AND INK-JET RECORDING METHOD AND INSTRUMENTS USING THE SAME

BACKGROUND OF THE INVENTION

1. Field of the Invention

The present invention relates to an ink suitable for use in recording by an ink-jet system or with a writing utensil, and a recording method, instruments and recording apparatus using such an ink.

2. Related Background Art

Inks with any of various dyes or pigments dissolved or dispersed in water or a liquid medium composed of water and an organic solvent have heretofore been used as inks for ink-jet recording or writing utensils.

Inks to be used in ink-jet recording systems are required to have the following performance characteristics:

(1) providing images sufficient in optical density;
(2) being able to quickly fix on a recording medium and causing no feathering;
(3) causing no clogging at an orifice;
(4) being able to stably conduct recording even upon continuous recording or resumption of recording after left to stand for a long period of time;
(5) undergoing no changes of physical properties even after stored for a long period of time;
(6) causing no problem about the safety of users; and
(7) exerting no adverse influence on means for generating thermal energy in an ink-jet system making good use of thermal energy.

Besides the requirements (1) to (7), they are also required to have the following properties for the purpose of conducting color recording:

(8) providing an even color solid print causing no color irregularity; and
(9) even when stopping ejection of an ink of a specific color from a specific nozzle for a predetermined period of time to use it in a part of a print to be produced, causing no ejection failure upon resumption of the ejection.

In order to satisfy the above-described requirements, it has been already reported in Japanese Patent Application Laid-Open Nos. 49-27732, 57-94066 and 58-2365 to add urea or any of various urea derivatives to an ink.

In order to prevent drying at a pen point, it has also been disclosed in Japanese Patent Application Laid-Open No. 4-331272 to use chitosan or N-carboxymethylchitosan.

However, the above prior art involves the following problems.

First, when urea is used, urea itself has low thermal stability though it has sufficient moisture retention, so that it is decomposed to generate carbon dioxide and ammonia. Accordingly, an ink to which urea is added is excellent in resistance to clogging and ejection stability as initial performance, but cannot last the initial performance when stored over a long period of time.

Second, it has been proposed to use urea derivatives, in which the hydrogen atoms of urea have been substituted by various substituents for the purpose of improving the thermal stability of urea. However, the use of such urea derivatives cannot bring about the same effects as urea has. More specifically, the moisture retention of urea is derived directly from the hydrophilicity of the amino groups in urea. Therefore, the substitution of a part of the hydrogen atoms of the amino groups by a alkyl group or the like reduces the effects characteristic of urea. In addition, urea and the urea derivatives have poor affinity for fibers, so that they do not contribute to improvement of the evenness of solid areas in images formed by ink-jet recording on various kinds of non-coated paper such as commercially-available paper for copying and bond paper, i.e., so-called plain paper.

Finally, the mere inclusion of conventionally-known chitosan or N-carboxymethylchitosan into an ink cannot improve the water fastness of the resulting recorded images.

SUMMARY OF THE INVENTION

The present invention has been made in view of these problems involved in the prior art, and has as its object the provision of an ink suitable for use in recording by an ink-jet system or with a writing utensil, which the ink (1) causes no clogging at an orifice even when stored for a long period of time, (2) can last good ejection stability, (3) provides even images on plain paper and (4) makes the water fastness of the resulting recorded images sufficiently practical, and an ink-jet recording method, instruments and recording apparatus using such an ink.

The above object can be achieved by the present invention described below.

According to the present invention, there is thus provided an ink comprising a recording agent, succinylated carboxymethylchitosan and a liquid medium.

According to the present invention, there is also provided an ink-jet recording method comprising applying energy to an ink to eject the ink, thereby conducting recording, wherein said ink is the ink described above.

According to the present invention, there is further provided a recording unit comprising an ink container portion containing an ink therein and a head from which the ink is ejected, wherein said ink is the ink described above.

According to the present invention, there is still further provided an ink cartridge comprising an ink container portion containing an ink therein, wherein said ink is the ink described above.

According to the present invention, there is yet still further provided an ink-jet recording apparatus comprising an ink cartridge equipped with an ink container portion containing an ink therein, and a recording head for ejecting the ink, wherein said ink is the ink described above.

According to the present invention, there is yet still further provided an ink-jet recording apparatus comprising a recording unit having an ink container portion containing an ink therein and a head from which the ink is ejected, wherein said ink is the ink described above.

DESCRIPTION OF THE PREFERRED EMBODIMENTS

Figure 1:
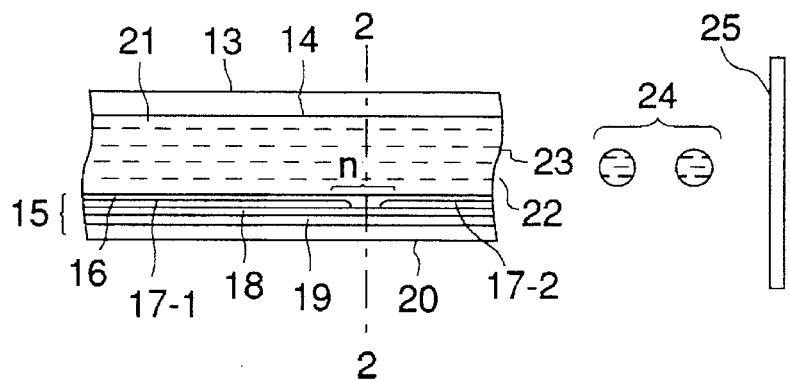
FIG. 1 is a longitudinal cross-sectional view of a head of an ink-jet recording apparatus.

According to the present invention, the use of succinylated carboxymethylchitosan permits the provision of an ink which has excellent moisture retention, causes no clogging, provides images high in optical density, causes no feathering, generates no deposit on a heater even when ejected for a long period of time by an ink-jet system making good use of thermal energy, undergoes no changes of physical properties and causes neither aggregation nor precipitation of a dye or pigment used therein even when stored for a long period of time, has excellent resistance to line marker, provides high-quality images high in evenness by an ink-jet recording, and makes the water fastness of the resulting recorded images sufficiently practical even when using a conventionally-known water-soluble dye having an anionic group as a recording agent, and of an ink-jet recording method and instruments using such an ink. The reason why such function is exhibited is as described below.

First, the resistance to clogging is considered to be improved by the formation of a succinylated carboxymethylchitosan layer and excellent resolubility of the layer. More specifically, the layer is formed on the surface of an ejection orifice of a head by evaporation of water. This layer is thinly formed in the vicinity of the ejection orifice, and so the composition of the ink inside the orifice remains unchanged. Accordingly, it is considered that the layer is redissolved in the ink by the flow of the ink owing to several bubbling processes, whereby printing is feasible. This phenomenon becomes easy to occur by adding a bubbling aid such as alcohol to the ink.

Second, the ununiformity of solid printed images and feathering, which are considered to be attributable to ununiformity of paper (for example, ununiformity of distribution of a size, irregularities of a surface, ununiformity of length and thickness of pulp fibers making up the paper, etc.), is considered to be improved by the use of succinylated carboxymethylchitosan, by which an affinity of the ink for the fibers of the paper is improved, and a penetrability of the ink is suppressed owing to viscosity increase of the ink.

Further, rub-off resistance and resistance to line marker of the ink are considered to be improved by the fact that a film of succinylated carboxymethylchitosan is formed by evaporation of water after printing, whereby the adhesion of a coloring material to paper is enhanced, and so the coloring material becomes resistant to physical shocks by an eraser or a marker. In particular, in the case where a pigment is used as a coloring material, rub-off resistance and resistance to a marker are improved by making a molecular weight of dispersant high or increasing the incorporating ratio of the dispersant to the pigment. However, the ejection property of the resulting ink is deteriorated. Therefore, the amount and kind of the dispersant are limited, so that the rub-off resistance and the resistance to a marker of such a pigment ink have been markedly poor. Accordingly, the effects by addition and dispersion of succinylated carboxymethylchitosan according to the present invention are great.

Further, with respect to aggregation and precipitation of a dye or pigment and changes of physical properties, succinylated carboxymethylchitosan is considered to perform a function of surrounding dye molecules or pigment particles to weaken the bonding of the molecules or the particles though the reason for it is not known. Accordingly, a pigment ink using succinylated carboxymethylchitosan as a dispersant causes neither aggregation nor precipitation of the pigment over a long period of time. When the use of succinylated carboxymethylchitosan as a dispersant is compared with the later addition of succinylated carboxymethylchitosan to an ink, the former case can bring about a greater effect for a prevention of aggregation and precipitation. This is considered to be due to the complete surrounding of the coloring material with succinylated carboxymethylchitosan.

Finally, the good water fastness of the recorded images is considered to be attributable to the fact that when a volatile ammonium salt or the like is used as an counter ion to terminal carboxyl groups at the succinylated sites and carboxyl groups of the carboxymethyl groups of succinylated carboxymethylchitosan, the ink itself has a good water solubility and a moisture retention, while it loses the water-solubility when the ammonium salt volatilizes as ammonia by the change of pH on paper after printing, and at the same time, a water-soluble dye contained in the ink turns hardly soluble in water owing to a synergistic effect of the amino acid moiety of the chitosan and the anionic group of the dye, for example, a sulfonic group or a carboxyl group.

The above-described features of the ink containing succinylated carboxymethylchitosan have effects which cannot be attained by the use of conventionally-known N-carboxymethylchitosan.

Besides, when succinylated carboxymethylchitosan is added to a water-based ink containing a hardly water-soluble dye, the resulting ink has a remarkable feature that even when ink-jet printing is conducted with such an ink on acid paper, no bronzing phenomenon is caused unlike inks added with urea. In this case, moreover, pH of the ink is not raised, and print quality is also not lowered.

The present invention will hereinafter be described in more detail by reference to preferred embodiments.

The ink according to the present invention is an ink comprising a recording agent, succinylated carboxymethylchitosan represented by the structural formula

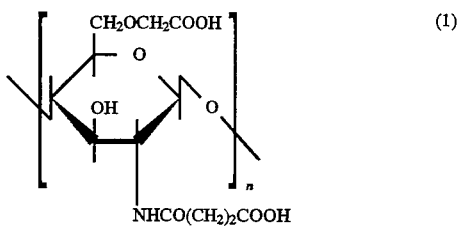

and a liquid medium.

A main feature of the ink according to the present invention resides in that succinylated carboxymethylchitosan is used. Succinylated carboxymethylchitosan useful in the practice of the present invention is obtained by acetylating water-insoluble chitin to make it water-soluble. This chitosan features that it forms a film by evaporation of a small amount of water, and the film is momentarily redissolved in water. Accordingly, it is preferable that a weight average molecular weight of succinylated carboxymethylchitosan be generally from about 5,000 to about 400,000. If the molecular weight is lower than 5,000, its film-forming ability and aggregation-preventing effect become poor. On the other hand, if the molecular weight is higher than 400,000, its water solubility becomes poor, and moreover, the resulting ink causes a phenomenon (kogation) that a residue upon bubbling is built up on a heating part. The weight average molecular weight is preferably from 100,000 to 400,000, more preferably from 200,000 to 400,000, most preferably about 300,000.

The ink containing succinylated carboxymethylchitosan according to the present invention preferably has a pH of 6 to 10.

A preferable amount of succinylated carboxymethylchitosan to be used varies according to its molecular weight. However, succinylated carboxymethylchitosan is preferably used in an amount to be a viscosity of 10 cP or lower in terms of an ink viscosity in view of a refilling property of the ink.

It is desirable that the amount be within a range of generally from 0.001 to 5% by weight, preferably from 0.001 to 3% by weight, more preferably from 0.001 to 1% by weight based on the total weight of the ink. If the amount is less than 0.001% by weight, the various effects of succinylated carboxymethylchitosan owing to the formation of a film cannot be exhibited. On the other hand, any amount more than 5% by weight results in an ink which is deteriorated in refilling property and causes kogation due to a viscosity increase of the ink.

When succinylated carboxymethylchitosan has a weight average molecular weight of, for example, about 300,000, its amount is preferably within a range of from 0.005 to 1% by weight, more preferably from 0.01 to 0.10% by weight.

The ink according to the present invention contains a recording agent and a liquid medium in addition to the above-described succinylated carboxymethylchitosan.

No particular limitation is imposed on recording agents usable in the ink according to the present invention so far as they are dyes and pigments compatible with the above-described succinylated carboxymethylchitosan. However, examples thereof include direct dyes, acid dyes, food dyes, basic dyes, reactive dyes, disperse dyes, vat dyes, water-soluble vat dyes, reactive disperse dyes, oil-soluble dyes and pigments.

Preferred dyes are dyes at least containing an anionic group. A content of these dyes in the ink varies according to a recording method in which the ink is used. However, it is desirable that the dyes be used in an amount ranging generally from 1 to 10% by weight, preferably from 1 to 5% by weight based on the total weight of the ink.

Examples of black pigments as the pigments include carbon black such as No. 2300, No. 900, MCF 88, No. 33, No. 40, No. 45, No. 52, MA 7, MA 8 and No. 2200B (all, products of Mitsubishi Kagaku Co. Ltd.); RAVEN 1255 (product of Columbian Carbon Japan Limited); REGAL 330R, REGAL 660R and MOGUL L (all, products of Cabot Company); and Color Black FW18, Color Black S170, Color Black S150, Printex 35 and Printex U (all, products of Degussa). Further, those newly prepared for the practice of the present invention may also be used in addition to the above pigments. A content of these pigments in the ink varies according to a recording method in which the ink is used. However, it is desirable that the pigments be used in an amount ranging generally from 3 to 12% by weight, preferably from 3 to 7% by weight based on the total weight of the ink.

Examples of a dispersant used in the case where the pigment is used as a coloring material include styrene-acrylic acid copolymers, styrene-acrylic acid-alkyl acrylate terpolymers, styrene-maleic acid copolymers, styrene-maleic acid-alkyl acrylate terpolymers, styrene-methacrylic acid copolymers, styrene-methacrylic acid-alkyl acrylate terpolymers, styrene-maleic acid half ester copolymers, vinylnaphthalene-acrylic acid copolymers, vinylnaphthalene-maleic acid copolymers and salts thereof. A content of these dispersants in the ink is desirably within a range of from 0.3 to 2% by weight based on the total weight of the ink.

As a liquid medium, a water-soluble organic solvent or a mixed solvent of a water-soluble organic solvent and water is used.

Examples of water-soluble organic solvents usable in the present invention include alkyl alcohols such as methyl alcohol, ethyl alcohol, n-propyl alcohol, isopropyl alcohol, n-butyl alcohol, sec-butyl alcohol, tert-butyl alcohol, isobutyl alcohol, n-pentanol and cyclohexanol; ketones and ketone alcohols such as acetone and diacetone alcohol; amides such as dimethylformamide and dimethylacetamide; ethers such as tetrahydrofuran and dioxane; addition polymerization products of oxyethylene or oxypropylene, such as diethylene glycol, triethylene glycol, tetraethylene glycol, dipropylene glycol, tripropylene glycol, polyethylene glycol and polypropylene glycol; alkylene glycols such as ethylene glycol, propylene glycol, trimethylene glycol, butylene glycol and hexylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether and tetraethylene glycol diethyl ether; sulfolane; N-methyl-2-pyrrolidone; and 1,3-dimethyl-2-imidazolidinone.

A content of these water-soluble organic solvents in the ink is generally within a range of from 1 to 50% by weight, preferably from 2 to 30% by weight based on the total weight of the ink.

The water-soluble organic solvents may be used either singly or as a mixture thereof. However, the most preferable composition of the liquid medium is such that it is composed of water and at least one of the water-soluble organic solvents, and the water-soluble organic solvent comprises a water-soluble high-boiling solvent, for example, a polyhydric alcohol such as diethylene glycol, triethylene glycol or glycerol.

A content of water in the ink is determined within a wide range depending upon the kinds and composition of the above-described solvents. However, it is generally used within a range of from 38 to 97% by weight, preferably from 65 to 97% by weight based on the total weight of the ink.

The principal components making up the ink according to the present invention are as described above. However, other various dispersants, surfactants, viscosity modifiers, surface tension modifiers, optical whitening agents, antioxidants, mildewproofing agents, pH adjustors and the like may be added within limits not impeding the achievement of the object of the present invention as needed.

As a preferred method and apparatus for conducting recording by using the ink according to the present invention, may be mentioned an ink-jet recording method and apparatus in which thermal energy corresponding to recording signals is applied to an ink within a recording head, and the ink is ejected by the thermal energy.

Figure 2:
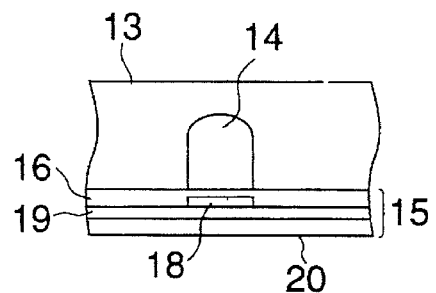
FIG. 2 is a transverse cross-sectional view of the head of the ink-jet recording apparatus.
Figure 3:
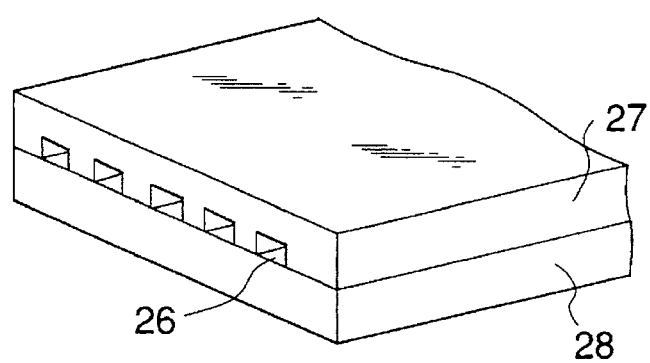
FIG. 3 is a perspective view of the appearance of a multi-head which is an array of such heads as shown in FIG. 1.

Examples of the construction of a head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawings show a head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure (not illustrated).

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the pressure thus produced, and the ink 21 is ejected from the orifice 22 to a recording medium 25 in the form of minute droplets 24.

FIG. 3 illustrates an appearance of a multi-head composed of an array of a number of heads as shown in FIG. 1. The multi-head is formed by closely bonding a glass plate 27 having a number of grooves 26 to a heating head 28 similar to the head as illustrated in FIG. 1.

Incidentally, FIG. 1 is a cross-sectional view of the head 13 taken along the flow path of ink, and FIG. 2 is a cross-sectional view taken along line 2—2 in FIG. 1.

Figure 4:
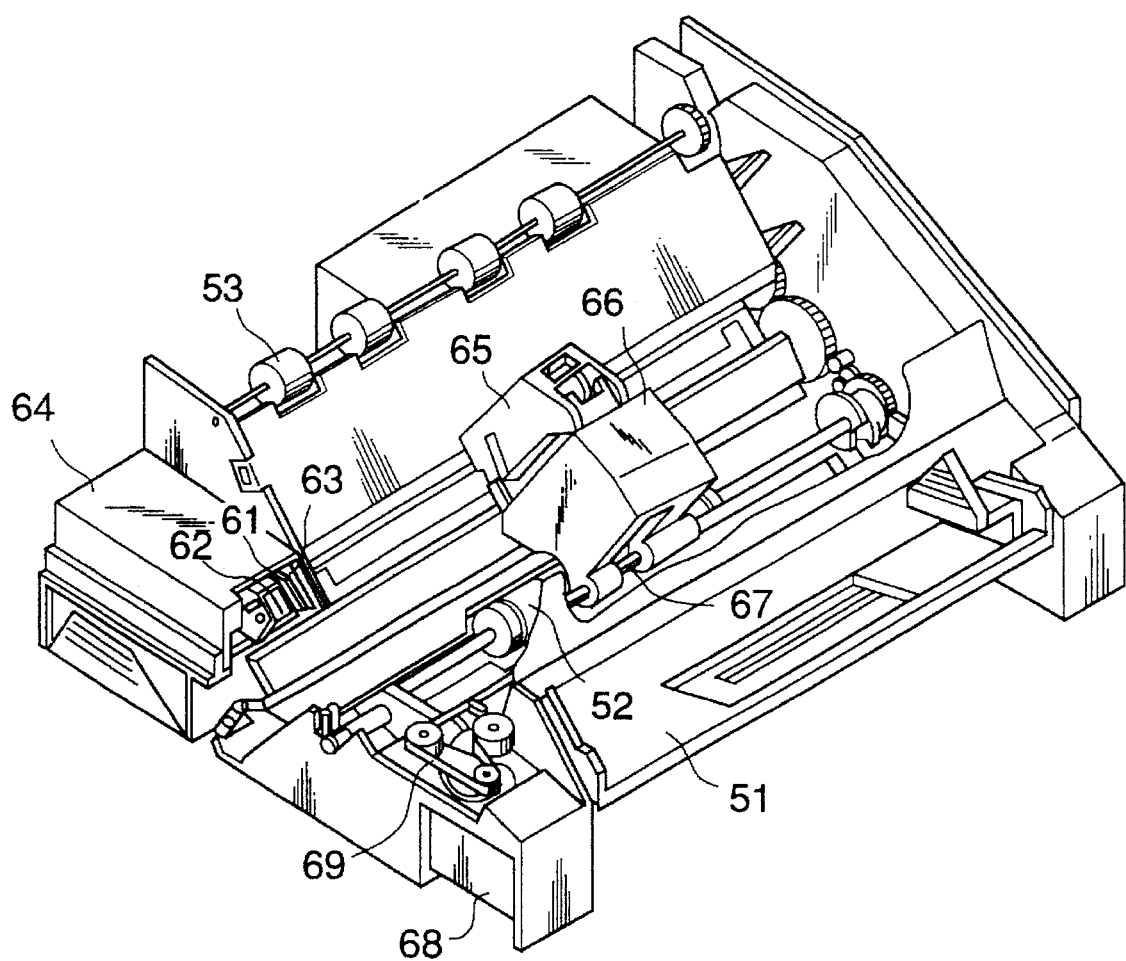
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes into the course through which the recording head is moved. Reference numeral 62 indicates a cap, which is provided at a home position adjacent to the blade 61, and is so constructed that it moves in a direction perpendicular to a direction in which the recording head is moved, and comes into contact with the face of ejecting openings to cap it. Reference numeral 63 denotes an ink-absorbing member provided adjoiningly to the blade 61 and, similar to the blade 61, held in such a form that it protrudes into the course through which the recording head is moved. The above-described blade 61, cap 62 and absorbing member 63 constitute an ejection-recovery portion 64, where the blade 61 and absorbing member 63 remove water, dust and/or the like from the face of the ink-ejecting openings.

Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a feeding part from which the recording media are separately inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
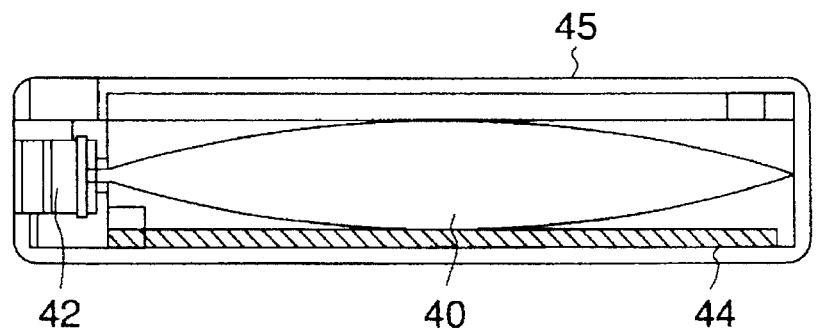
FIG. 5 is a longitudinal cross-sectional view of an ink cartridge.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus used in the present invention are not limited to the apparatus as described above in which the head and the ink cartridge are separately provided. Therefore, a device in which these members are integrally formed as shown in FIG. 6 can also be preferably used.

Figure 6:
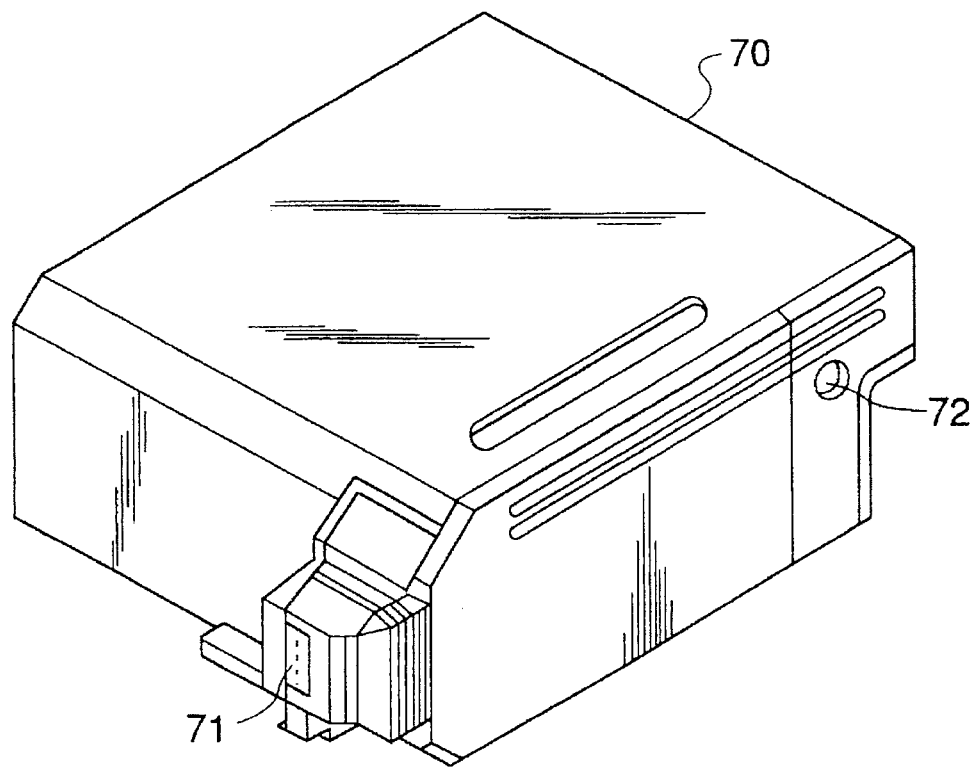
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In the present invention, polyurethane, cellulose or polyvinyl acetal is preferably used as a material for the ink-absorbing member.

Reference numeral 72 indicates an air passage for communicating the interior of the recording unit 70 with the atmosphere. This recording unit 70 is used in place of the recording head shown in FIG. 4, and is detachably installed on the carriage 66.

The present invention will hereinafter be described in more detail by the following Examples and Comparative Examples.

EXAMPLES 1 TO 3 AND COMPARATIVE EXAMPLES 1 AND 2

Their corresponding components shown in the following Table 1 were mixed into solutions. The solution in Example 3 was adjusted to pH 9 to 10 with aqueous ammonia. The resultant solutions were then filtered through a filter having a pore size of 0.2 µm, thereby preparing inks according to Examples 1 to 3 of the present invention and Comparative Examples 1 and 2, respectively. Incidentally, all numerals given below as to the compositions mean % by weight unless expressly noted.

TABLE 1

|  | Example |  |  | Comp. Example |  |
|---|---|---|---|---|---|
|  | 1 | 2 | 3 | 1 | 2 |
| Diethylene glycol | 15 | 15 | 15 | 15 | 15 |
| Chitosan E of the invention | 50 | 3 | 0.25 | — | — |
| Compound D | — | — | — | — | 5 |
| Recording agent | A | B | C | A | A |
| Amount of recording agent added | 3 | 3 | 3 | 3 | 3 |
| Ethanol | 4 | 4 | 4 | 4 | 4 |
| Purified water | 28 | 75 | 77.75 | 78 | 73 |

The recording agents A, B and C in Table 1 are the following dyes, respectively.

Recording agent A: C.I. Food Black 2;
Recording agent B: C.I. Direct Black 168; and
Recording agent C: a dye represented by the following structural formula

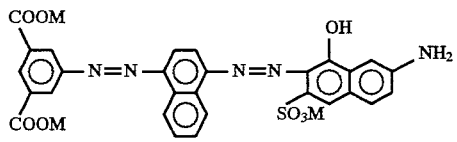

$(M = NH_4^{\oplus})$

Compound D: Cytoglycan (trade name, N-carboxymethyl. chitosan, product of Chito-Bios S.p.A. in Italy)

Chitosan E: Succinylated carboxymethylchitosan (product of Kawaken Fine Chemicals Co., Ltd.; trade name: Chitoaqua; weight average molecular weight: about 300,000; as a 2% aqueous solution)

Each of the inks obtained above was charged into a cartridge integrally provided with a recording head. This cartridge was mounted in an On-Demand type printer (BJ200, trade name, manufactured by Canon Inc.) which makes a record by applying thermal energy to the ink in the recording head to generate droplets of the ink, thereby conducting printing to evaluate the ink in the following points.

The results of the evaluation are shown in the following Table 2.

(1) Stability to continuous ejection:

English characters and numerals (80 letters×40 lines) were continuously printed on 400 sheets of A4-sized paper (NP paper, trade name, product of Canon Inc.), thereby evaluating the ink as to the stability to continuous ejection to rank it in accordance with the following standard:
A: Normal in ejection; and
B: Ejection failure occurred from the middle.

(2) Stability to intermittent ejection:

When an intermittent operation of 10-second continuous ejection→suspension of ejection for a predetermined period of time→resumption of continuous ejection is conducted, ejection failure tends to occur upon the resumption of the ejection as the suspension time is made longer. Therefore, this suspension time was varied, thereby determining the stability to intermittent ejection to rank the ink in accordance with the following standard:
A: Stably ejected even after suspended for 45 seconds or longer;
B: Stably ejected after suspended for from 44 down to 30 seconds; and
C: Stably ejected only after suspended for 29 seconds or shorter.

(3) Evenness of solid print:

Printing was conducted on plain paper for copying (NP paper, trade name, product of Canon Inc.) with all of nozzles simultaneously driven to prepare a solid print patch. The evenness of solid print was evaluated to rank the ink in accordance with the following standard:
A: Good in evenness;
B: Unevenness was somewhat observed; and
C: Unevenness was considerably observed.

(4) Clogging tendency:

After the cartridge was left over for 1 week without cap in a thermostatic chamber kept at 60° C., it was mounted in the printer to conduct recovery operation by a pump for recovery built in the printer body, thereby determining recovery property from clogging to rank the ink as to the clogging tendency in accordance with the following standard:
A: Normal printing was feasible by conducting recovery operation at most 2 times;
B: Normal printing was feasible by conducting recovery operation 3 to 6 times; and
C: Normal printing was infeasible even after conducting recovery operation at least 7 times.

(5) Storage stability of ink:

After the cartridge was left over for 3 months with a cap put thereon in a thermostatic chamber kept at 60° C., it was mounted in the printer to continuously print English characters and numerals, thereby evaluating the ink as to storage stability to rank it in accordance with the following standard:
A: Normal in printing;
B: Partial disorder of printing occurred; and
C: Disorder of printing occurred to a significant extent.

(6) Water fastness of recorded image:

After the print sample obtained by printing English characters and numerals on the Canon NP paper in the evaluation as to (1) the stability to continuous ejection was left over for 1 hour and then immersed for 3 seconds in water, the water fastness of the recorded image was evaluated by the degree of blurring of the characters to rank the ink in accordance with the following standard:
A: Blurring of the characters was scarcely observed;
B: Blurring of the characters was somewhat observed, but caused no problem in actual use; and
c: The characters blurred to such an extent that problems were caused in actual use.

(7) Resistance to line marker:

After a character area of a print sample obtained by printing on NP paper (trade name, product of Canon Inc.) was overwritten once with a yellow line by means of a yellow line marker, and just after overwritten, the same area was overwritten again, the resistance to line marker was evaluated by the degree of blurring of characters to rank the ink in accordance with the following standard:
A: Blurring of the characters was scarcely observed;
B: Blurring of the characters was somewhat observed, but caused no problem in actual use; and
C: The characters blurred to such an extent that problems were caused in actual use.

TABLE 2

| | Evaluation item | Example 1 | Example 2 | Example 3 | Comp. Example 1 | Comp. Example 2 |
|---|---|---|---|---|---|---|
| (1) | Stability to continuous ejection | A | A | A | A | B |
| (2) | Stability to intermittent ejection | A | A | A | B | C |
| (3) | Evenness of solid print | A | A | A | B | B |
| (4) | Clogging tendency | A | A | A | C | C |
| (5) | Storage stability of ink | A | A | A | B | C |
| (6) | Water fastness of recorded image | B | B | A | C | C |
| (7) | Resistance to line marker | A | A | A | B | B |

Preparation Examples of Pigment Dispersion:
Styrene-acrylic acid-ethyl acrylate 3 parts terpolymer (acid value: 140, weight average molecular weight: 5,000)
Monoethanolamine 1 part
Purified water 71 parts
Ethylene glycol 5 parts.

The above components were mixed and heated to 70° C. on a water bath to completely dissolve the resin component therein. Added to this solution were 15 parts of carbon black (MCF 88, product of Mitsubishi Kagaku Co., Ltd.) and 5 parts of isopropyl alcohol to premix them for 30 minutes. Thereafter, the resulting premix was subjected to a dispersion treatment under the following conditions.
Dispersing machine: sand grinder (manufactured by Igarashi Kikai K.K.)
Grinding medium: zirconium beads (diameter: 1 mm)
Packing rate of grinding medium: 50% (by volume)
Grinding time: 3 hours.

The thus-ground mixture was further subjected to a centrifugal treatment (12,000 rpm, 20 minutes) to remove coarse particles into a dispersion (Pigment Dispersion 1).

The following components were subjected to a dispersion treatment in the same manner as described above, thereby obtaining a dispersion (Pigment Dispersion 2).
Carbon black (MOGUL L, product of 15 parts Cabot Company)
Styrene-butyl acrylate copolymer 2 parts (acid value: 120, MW: 6,100)
Monoethanolamine 1 part
Purified water 72 parts
Ethylene glycol 5 parts
Isopropyl alcohol 5 parts.

The following components were subjected to a dispersion treatment in the same manner as described above, thereby obtaining a dispersion (Pigment Dispersion 3).
Carbon black (MCF 88, product of 15 parts Mitsubishi Kagaku Co., Ltd.)
Styrene-butyl maleate copolymer 2 parts (acid value: 100, MW: 20,000)
Monoethanolamine 1 part
Purified water 72 parts
Ethylene glycol 5 parts
Ethyl alcohol 5 parts.

EXAMPLES 4 TO 6 AND COMPARATIVE EXAMPLES 3 AND 4

Their corresponding components shown in the following Table 3 were mixed into solutions, thereby preparing inks according to Examples 4 to 6 of the present invention and Comparative Examples 3 and 4, respectively.

TABLE 3

| | Example 4 | Example 5 | Example 6 | Comp. Example 3 | Comp. Example 4 |
|---|---|---|---|---|---|
| Diethylene glycol | 15 | 15 | 15 | 15 | 15 |
| Ethanol | 4 | 4 | 4 | 4 | 4 |
| Chitosan E of the invention | 5 | 2 | 1 | — | — |
| Compound D | — | — | — | — | 5 |
| Pigment Dispersion (1) | 30 | — | — | 30 | 30 |
| Pigment Dispersion (2) | — | 30 | — | — | — |
| Pigment Dispersion (3) | — | — | 30 | — | — |
| Purified water | 46 | 49 | 50 | 51 | 46 |

These inks were evaluated in the same manner as in Examples 1 to 3 and Comparative Examples 1 to 2. The results of the evaluation are shown in Table 4.

TABLE 4

| | Evaluation item | Example 4 | Example 5 | Example 6 | Comp. Example 3 | Comp. Example 4 |
|---|---|---|---|---|---|---|
| (1) | Stability to continuous ejection | A | A | A | A | B |
| (2) | Stability to intermittent ejection | A | A | A | B | C |
| (3) | Evenness of solid print | A | A | A | B | B |
| (4) | Clogging tendency | A | A | A | C | C |
| (5) | Storage stability of ink | A | A | A | C | C |
| (6) | Water fastness of recorded image | A | A | A | A | A |
| (7) | Resistance to line marker | A | A | A | C | B |

According to the present invention, as described above, there can be provided inks which have stability to continuous ejection, stability to intermittent ejection, resistance to bronzing and pH-keeping ability equal to those of the conventional inks containing urea, thiourea or a derivative thereof, generate no precipitate due to the aggregation of a dye or pigment, are excellent in resistance to clogging, storage stability and resistance to line marker, and improve the water fastness of recorded images even when a water-soluble dye having an anionic group is used as a recording agent, and an ink-jet recording method and instruments using such an ink.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising a recording agent, succinylated carboxymethylchitosan and a liquid medium.

2. The ink according to claim 1, wherein the recording agent is a dye at least having an anionic group.

3. The ink according to claim 1, wherein the recording agent is a pigment.

4. The ink according to claim 1, wherein the succinylated carboxymethylchitosan has a weight average molecular weight of from 5,000 to 400,000.

5. The ink according to claim 1, wherein the liquid medium comprises a water-soluble organic solvent, or a water-soluble organic solvent and water.

6. An ink-jet recording method comprising applying energy to an ink to eject the ink, thereby conducting recording, wherein said ink is the ink according to claim 1.

7. The ink-jet recording method according to claim 6, wherein the energy applied to the ink is thermal energy.

8. A recording unit comprising an ink container portion containing an ink therein and a head from which the ink is ejected, wherein said ink is the ink according to claim 1.

9. The recording unit according to claim 8, wherein the head is a head which applies thermal energy to the ink to eject the ink.

10. An ink cartridge comprising an ink container portion containing an ink therein, wherein said ink is the ink according to claim 1.

11. An ink-jet recording apparatus comprising an ink cartridge equipped with an ink container portion containing an ink therein, and a recording head for ejecting the ink, wherein said ink is the ink according to claim 1.

12. The ink-jet recording apparatus according to claim 11, which comprises a feeding part for feeding the ink contained in the ink cartridge to the recording head.

13. The ink-jet recording apparatus according to claim 11 or 12, wherein the head is a head which applies thermal energy to the ink to eject the ink.

14. An ink-jet recording apparatus comprising a recording unit having an ink container portion containing an ink therein and a head from which the ink is ejected, wherein said ink is the ink according to claim 1.

15. The ink-jet recording apparatus according to claim 14, wherein the head is a head which applies thermal energy to the ink to eject the ink.

* * * * *

UNITED STATES PATENT AND TRADEMARK OFFICE
CERTIFICATE OF CORRECTION

PATENT NO. : 5,651,814
DATED : July 29, 1997
INVENTOR(S) : Masako SHIMOMURA

It is certified that error appears in the above-indentified patent and that said Letters Patent is hereby corrected as shown below:

IN THE COVER PAGE:

[56] References Cited - U.S. Patent Documents
change "5,113,803  5/1992  Moffatt" to --5,133,803  7/1992  Moffatt--.

COLUMN 11:

Line 18, delete "3 parts";
Line 19, change "5,000)" to --5,000)     3 parts--;
Line 41, delete "15 parts";
Line 42, change "Company)" to --Company)     15 parts--;
Line 43, delete "2 parts";
Line 44, change "6,100)" to --6,100)     2 parts--;
Line 52, delete "15 parts";
Line 53, change "Ltd.)" to --Ltd.)     15 parts--;
Line 54, delete "2 parts"; and
Line 55, change "20,000)" to --20,000)     2 parts.--

Signed and Sealed this

Twenty-first Day of July, 1998

*Attest:*

BRUCE LEHMAN

*Attesting Officer*      Commissioner of Patents and Trademarks